United States Patent [19]

Engel

[11] 4,074,889
[45] Feb. 21, 1978

[54] ROTARY VALVE

[75] Inventor: Hans O. Engel, Hanau, Germany

[73] Assignee: Honeywell G.m.b.H., Frankfurt am Main, Germany

[21] Appl. No.: 764,412

[22] Filed: Jan. 31, 1977

Related U.S. Application Data

[63] Continuation-in-part of Ser. No. 636,107, Nov. 28, 1975, abandoned.

[30] Foreign Application Priority Data

Feb. 28, 1975 Germany .............................. 2508755

[51] Int. Cl.² .............................................. F16K 1/18
[52] U.S. Cl. ..................................... 251/298; 251/85; 251/357
[58] Field of Search ................................ 137/527–534; 251/84–86, 298, 304, 317, 357

[56] References Cited

U.S. PATENT DOCUMENTS

| 2,247,773 | 7/1941 | Dunn ................................. 137/527.4 |
| 2,850,259 | 9/1958 | Larson ..................................... 251/86 |
| 3,042,358 | 7/1962 | Anderson ........................ 251/85 UX |
| 3,191,906 | 6/1965 | Zeigler et al. .................... 251/304 X |
| 3,272,474 | 9/1966 | Pro ...................................... 251/85 X |
| 3,379,408 | 4/1968 | Lowrey ............................. 251/333 X |
| 3,521,659 | 7/1970 | Seger ............................. 137/527.4 X |
| 3,623,696 | 11/1971 | Baumann ......................... 251/298 X |
| 3,749,358 | 7/1973 | Bates ................................... 251/298 |
| 3,876,179 | 4/1974 | Baumann ............................ 251/298 |
| 3,963,211 | 6/1976 | Myers ................................... 251/85 |

FOREIGN PATENT DOCUMENTS

| 550,238 | 4/1956 | Belgium ............................... 251/86 |

Primary Examiner—Robert G. Nilson
Attorney, Agent, or Firm—Laurence J. Marhoefer; Lockwood D. Burton; George E. Bodenstein

[57] ABSTRACT

A rotary control valve has a plug in the form of a cup shaped shell mounted on a bracket which is rotatable about an axis orthogonal to and offset from the central axis of a ring seat. This plug is connected to the rotatable actuating bracket by means of a threaded pin and nut so that the plug position can be adjusted with respect to the ring seat. Proper adjustment of the pin and nut allows the plug to be mounted in a fixed position on the bracket and enables the plug to be brought into and out of fluid tight sealing engagement with the ring seat without any bending or deformation taking place in the actuating bracket. The obtaining of this desired tight sealing engagement is aided by displacing the bracket axis from the plug center of curvature in the direction of the position occupied by the plug when in its sealing position, and by making the plug position adjustable along the bracket axis.

13 Claims, 6 Drawing Figures

ROTARY VALVE

CROSS-REFERENCE TO RELATED APPLICATION

This application is a continuation-in-part of application Ser. No. 636,107, filed Nov. 28, 1975, and now abandoned.

BACKGROUND OF THE INVENTION

1. Field of the Invention

The invention relates to an improved rotary valve for fluid control, and, more particularly, to a rotary valve of the so-called eccentric type.

2. Description of the Prior Art

There have been many different types of spherical faced plugs used in prior art valves that are constructed for movement into and out of engagement with a seat port. One example of such a prior art valve is shown in the Baumann U.S. Pat. No. 3,623,696.

The plug that is disclosed in the aforementioned patent and an arm which extends therefrom are of a solid one unit construction. The valve plug and arm are rotatable eccentrically relative to a seat port by means of an actuator shaft mounted in the wall portion of a valve chamber.

As the actuator shaft is rotated in one direction, it rotates the spherical face of the plug eccentrically relative to the seat face of the seat port. when a portion of the plug comes in contact with the seat face, the arm commences to bend along its longitudinal axis, and this results in the spherical face of the plug being rubbed against the seat face as continued rotation of the plug toward its closed valve position occurs.

A similar rubbing action as that just described takes place between the spherical contact portion of the plug and the seat face of the seat port when the plug is moved toward its open position.

From the aforementioned description it can be seen that a rubbing force is applied on a small segment of the seat port during each successive port closing and port opening operation. This rubbing action thus causes or tends to cause wear to occur between the rubbing surface of the spherical plug and the surfaces of the seat port. The greatest wear occurs where the segments of the plug and the seat port portion are first brought into contact with one another as the valve is closed.

As the valve continues to cycle between an open and closed position, this action results in an uneven wear between the plug and the seat port and results in increasing leakage between the plug and the seat port.

Further, the parts of such a prior art valve must be produced with fine tolerances, and its parts assembled in a precise actuating manner, in order to procure tight sealing between its plug and seat port.

A Zeigler et al. U.S. Pat. No. 3,191,906 shows another prior art rotary valve, as does the Myers U.S. Pat. No. 3,963,211. Although such valves doubtless have utility from certain standpoints, there has still remained a need for a tight closing, long wearing, easily adjusted, reliable, and economically producible eccentric rotary valve.

SUMMARY OF THE INVENTION

It is an object of the present invention to provide an improved eccentric rotary valve that can be easily and economically manufactured. It is another object of the invention to provide a valve of the aforementioned type that provides fluid-tight closing over long periods of time during which the valve is repeatedly operated between an open and closed position. It is an additional object of the invention to provide such an improved valve which can be readily adjusted to provide said fluid-tight closing notwithstanding the presence of dimensional variations due to manufacturing tolerances.

In accordance with the present invention, there is provided a rotary control valve that has an eccentric mounted plug in the form of a cup shaped shell. This plug is adjustably connected to a rotatable actuating bracket by means of a threaded pin and nut. The bracket is supported on an actuator shaft that is rotatably mounted in a valve housing so that the plug can be tilted about an axis that is positioned orthogonally or rectangularly and offset with respect to the longitudinal axis of a ring seat. Proper adjustment of the pin and nut allows the plug to be mounted in a fixed position on the bracket and enables the plug face to be brought into and out of fluid-tight sealing engagement with the ring seat without any bending or deformation taking place in the actuating bracket.

Where dimensional variations due to manufacturing tolerances create a difficulty in obtaining said tight sealing engagement by the noted adjustment of said pin, the valve according to the invention may advantageously have its actuator shaft so relatively located that the distance from the plug face to its center of curvature on the ring seat axis, when the plug is in its closed position on the ring seat, is greater than the distance from the plug face along said axis to the perpendicular projection of the actuator shaft axis onto said ring seat axis. Also, said valve may advantageously have its actuator shaft supported by an adjustable guide sleeve to permit this shaft, and hence the plug, to be adjustably positioned along the shaft axis. The inclusion of one or both of these two further constructional features, as required, aids in obtaining said tight sealing engagement by the noted adjustment of said pin, without producing bending or deformation of said actuating bracket, and notwithstanding the presence of said dimensional variations.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENTS

THE VALVE OF FIGS. 1-3

Figure 1:
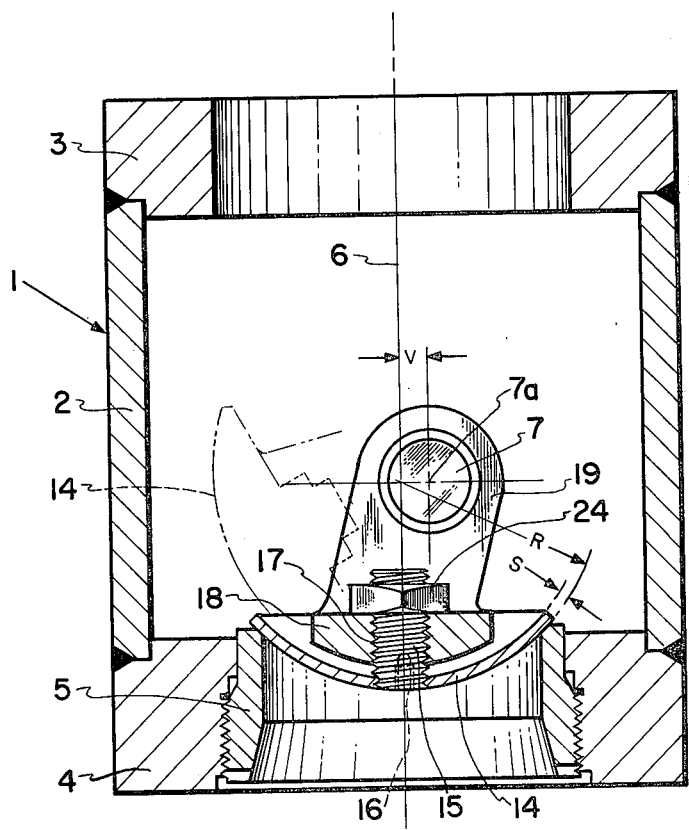
FIG. 1 is a cross-sectional view of one valve embodiment of the invention taken along the longitudinal axis of the valve housing when the valve is closed.

Referring now to FIG. 1 of the drawings, a valve housing 1 has a tube shaped portion 2 and two end discs 3 and 4 welded thereto. A ring seat 5 is screwed into the disc 4. The ring seat 5 is preferably concentrically arranged with respect to the longitudinal axis 6 of the housing 1.

Figure 2:
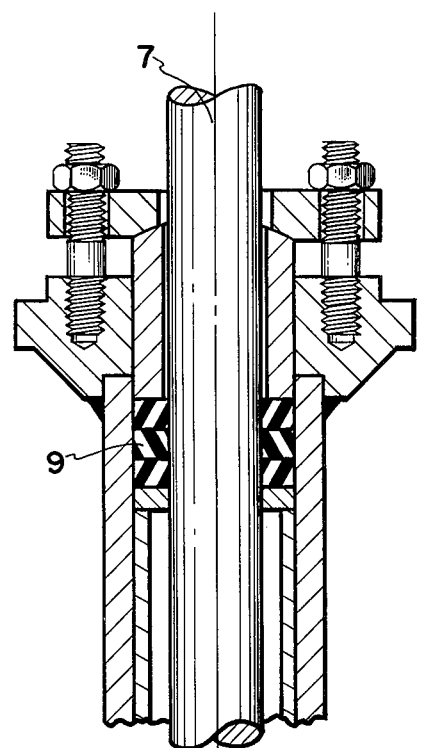
FIG. 2 is another sectional view of the valve of FIG. 1 in an open position, this view being taken through the body of the valve.
Figure 2:
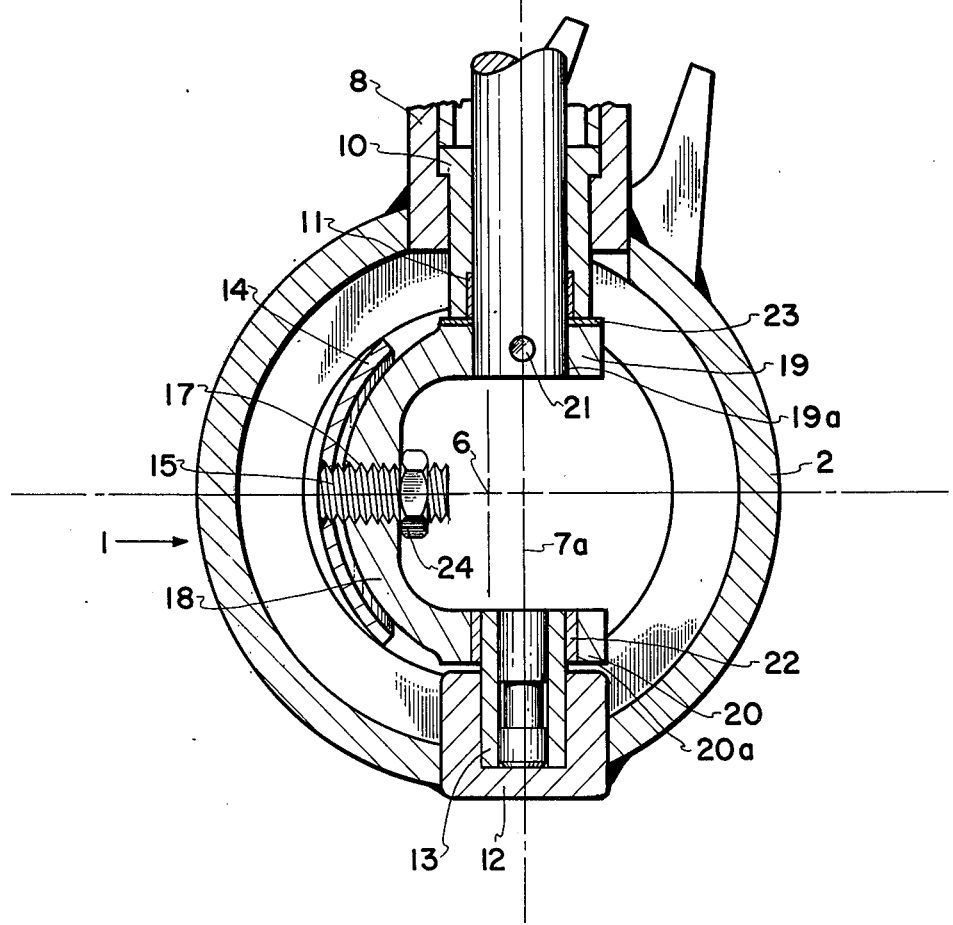

The longitudinal axis 6 of the housing 1 and the ring seat 5 is rectangularly positioned and offset by an amount V with respect to the longitudinal axis 7a of an actuator shaft 7. FIG. 2 shows the actuator shaft 7 supported in a cylindrical housing 8. The cylindrical housing 8 holds a packing 9, a guide sleeve 10, and a cylindrical bearing 11 that is supported on the inner surface of the sleeve 10. A fixed sleeve 12 retains a trunnion 13 fastened in the housing 1 so that its longitudinal axis is in alignment with the longitudinal axis 7a of the actuator shaft 7. The sleeve 12 and the cylindrical housing 8 are welded to the housing 1.

The throttling or plug member is a cap 14 in a form that can be described as a ball segment or a cup shaped shell. The cap 14 has a central threaded pin 15 whose longitudinal axis passes through the center of curvature of the cap 14. The cap 14 and the threaded pin 15 are fixedly connected for joint movement. For example, the pin 15 can be welded to the cap 14. The pin 15 has a fine thread 17 which engages mating female threads in the central portion of an actuating arm or bracket support 18. There is an internal hexagon-shaped socket 16 in one end of the threaded pin 15. A small wrench can be inserted into the socket 16 and used to rotate the pin 15 and the cap 14 to cause the cap 14 to move relative to the bracket 18, thereby adjusting the position of the cap 14 relative to the ring seat 5.

Figure 3:
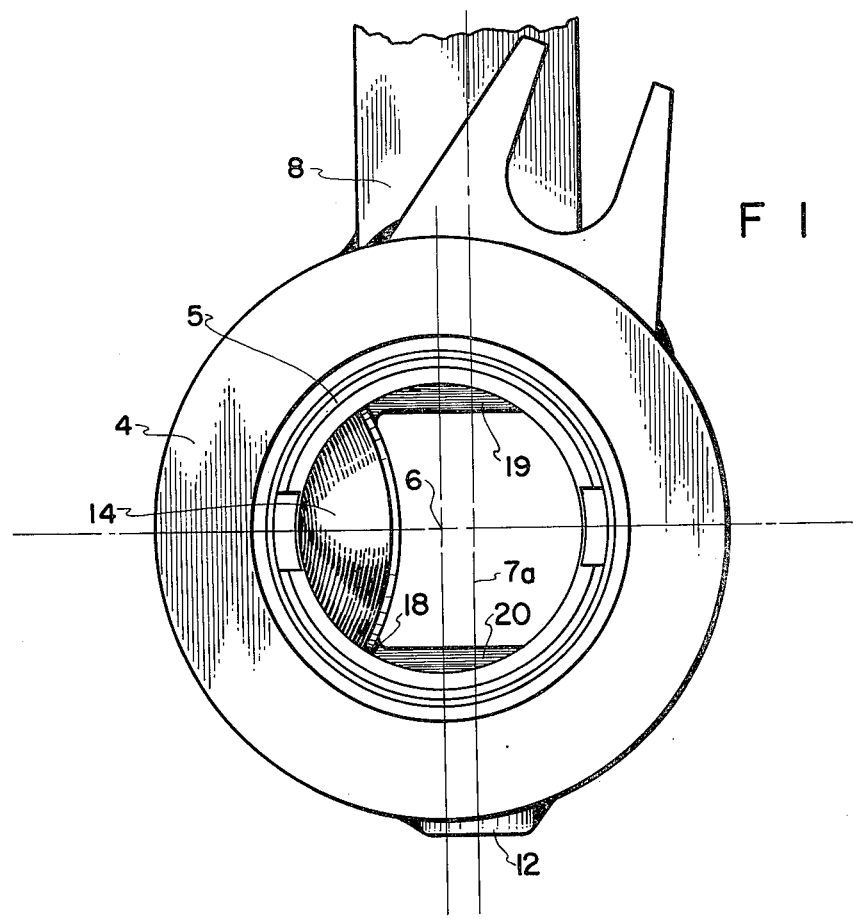
FIG. 3 is an end view of the valve of FIG. 1 shown in an open position as viewed from the lower end of FIG. 1.

As can be seen in FIG. 3, when the valve is in an open position, the bracket support 18 does not hinder flow of the fluid medium through the valve. The bracket 18 has an opening in each of its side portions 19 and 20. The actuator shaft 7 is secured in the opening 19a in the side portion 19 by means of a pin 21, for example.

A bearing sleeve 22 is mounted in the boxed-out passageway or opening 20a that is formed in the side portion 20. The bearing sleeve 22 is rotatably mounted on the trunnion 13. A ring 23 is located between the internal front surface of the guide sleeve 10 and the opposite surface of the side portion 19. On the opposite side there is a little play between the inner open front face of the fixed sleeve 12 and the adjacent end of the side portion 20 to allow a small axial movement of the actuator shaft 7 and its associated bracket 18.

A counter nut 24 retains the threaded pin 15 in a selected position on the bracket support 18, and prevents movement of the cap 14 relative to the bracket support 18, when the nut 24 is brought into pressing engagement with this bracket support.

OPERATION OF THE VALVE OF FIGS. 1 - 3

After assembling the cap-shaped plug 14, the bracket 18, and the actuator shaft 7 as shown in FIG. 2, the actuator shaft 7 is rotated to bring the plug 14 from its phantom line position to its closed, solid line position against the ring seat 5, as shown in FIG. 1. A hexagonal-shaped socket wrench, not shown, is then inserted into the similarly shaped socket 16 formed in one end of the pin 15. Rotation of this wrench is used to rotate the cap-shaped plug 14 and its associated threaded pin 15 along the fine thread of the bracket support 18 until an entire circumference of the cap-shaped plug 14 is closed tightly against the ring seat 5. The cap 14 is then secured in place by adjusting the counter nut 24 along the threaded pin 15 until the face of the nut 24 is brought into pressing engagement with the bracket 18.

Instead of making the cap 14 like a cup or shell, it could also have the form of a mushroom. In this case, the surface of the bracket 18 facing the cap 14 would be planar.

In the preferred embodiment shown in FIGS. 1 through 3 of the drawing, the outer edge of the cap 14 is slightly resilient so that it can compensate for any changes caused by wear or temperature influences. In the drawing, the cap 14 is shown as having an equal thickness S throughout. Instead of this cap construction, its thickness may be reduced from a center portion to its outer edge portion. The shown embodiment is preferred however since it can be manufactured more easily.

When the cap 14 is properly seated, the center of the radius of curvature R of the cap 14 lies on the longitudinal axis 6 of the housing 1 and also on the co-axial center axis of the ring seat 5. However, the longitudinal axis 7a of the actuator shaft 7 is offset by the amount V, which amount is dependent on the nominal diameter of the valve and typically lies between 5 and 15 millimeters. The outer diameter of the cap 14 is only slightly bigger than the internal diameter of the ring seat 5 in order to have as small an influence as possible on the fluid medium flow when the valve is open. When the valve is open, the position of the throttling or plug member 14 is as shown by the phantom or dash-dotted lines in FIG. 1 of the drawing.

THE VALVE OF FIGS. 4 AND 5

Figure 4:
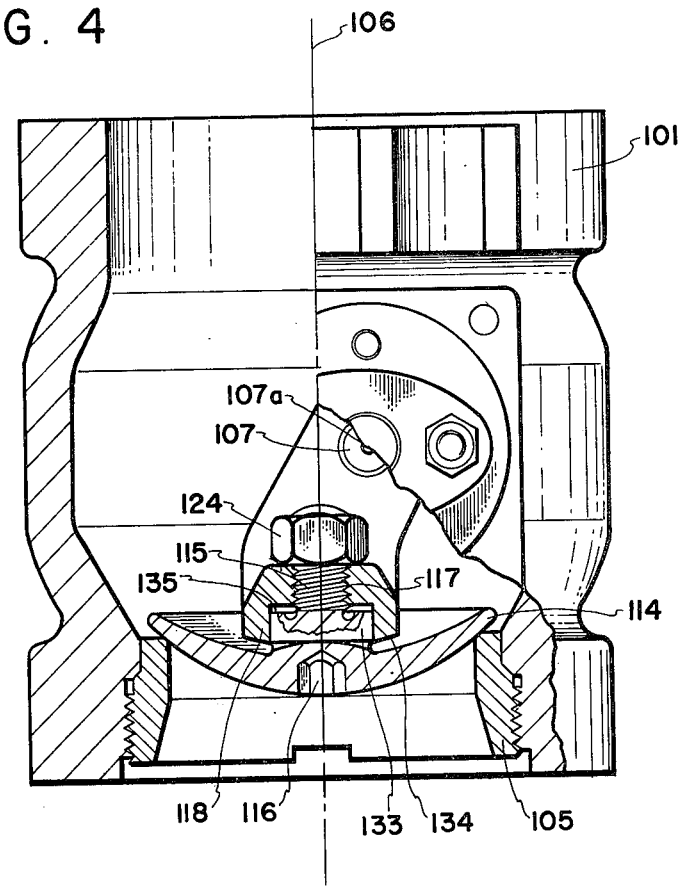
FIGS. 4 and 5 are views, like those of FIGS. 1 and 2, respectively, of another valve embodying the invention and including the above-noted two further constructional features.
Figure 5:
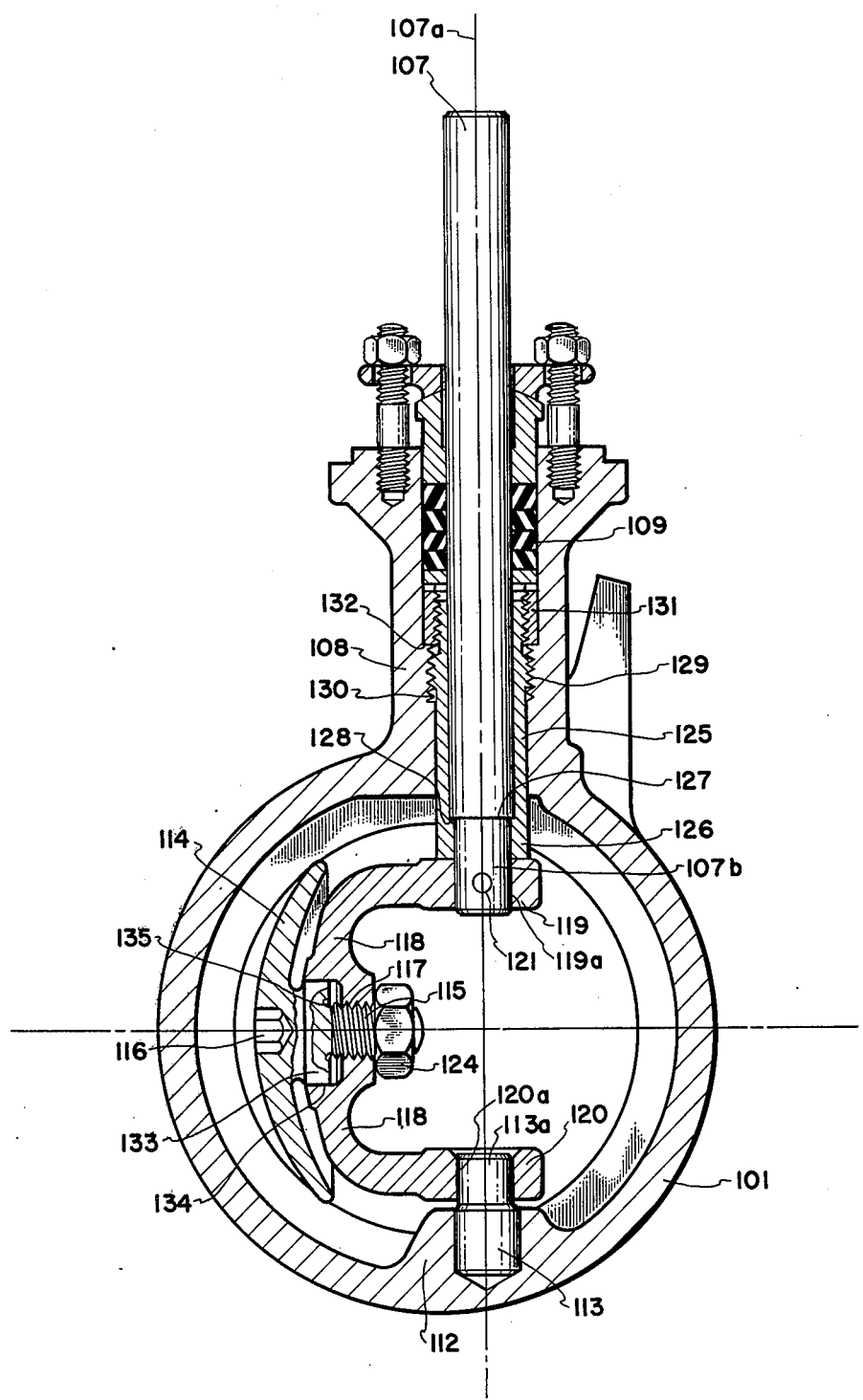

The valve illustrated in FIGS. 4 and 5, although similar to the valve of FIGS. 1 though 3 as just described, differs essentially from the latter valve by embodying the two previously described further constructional features. As previously noted, these further constructions provide an aid in obtaining the desired tight cap to ring seat sealing engagement without requiring bending or deformation of the bracket support, and notwithstanding the existence of the noted dimensional variations.

In accordance with the foregoing, the valve of FIGS. 4 and 5 includes much of the structure of the valve of FIGS. 1 through 3, additionally includes the first of said further constructional features, i.e., the aforementioned advantageous positional relationship between the plug cap center of curvature and the actuator shaft axis, and additionally includes the second of said further constructional features, i.e., the aforementioned adjustable guide sleeve for the actuator shaft. In addition to embodying the said two further constructional features just described, the valve of FIGS. 4 and 5 employs a cap and bracket support construction which is somewhat different from that of the valve of FIGS. 1 through 3. In FIGS. 4 and 5, parts which are the same as or are similar to parts illustrated in FIGS. 1 through 3 bear the same reference numerals as their earlier counterparts but with a hundreds digit added.

Considering first the parts last referred to above, it is seen that the valve of FIGS. 4 and 5 includes a housing 101 containing a concentric, screwed-in ring seat 105, the axis of which coincides with the longitudinal axis 106 of the housing 101. The axis 106 is offset from the longitudinal axis 107a of an actuator shaft 107 by an amount V as in the case of the valve of FIGS. 1 through 3. The offset distance V for the valve of FIGS. 4 and 5 is shown on the diagram of FIG. 6 which is described hereinafter.

The actuator shaft 107 is supported in a cylindrical bearing portion 108 of the housing 101, which portion also contains a packing 109. A sleeve portion 112 of the housing 101 supports a trunnion 113 which is in axial alignment with the axis 107a.

A bracket support 118 has a side portion 119 containing an opening 119a which fits over an end portion 107b of the actuator shaft 107. The diameter of the portion 107b is smaller than that of the remainder of the actuator shaft 107. The side portion 119 is fixed to the portion 107b by a pin 121. The support 118 also has an opposite side portion 120 containing an opening 120a which fits over and is displaceable along a reduced diameter portion 113a of the trunnion 113.

The above-mentioned adjustable guide sleeve for the valve of FIGS. 4 and 5 is shown at 125 in FIG. 5. The sleeve 125 surrounds and supports the actuator shaft 107 within the cylindrical portion 108. The sleeve 125 has a portion 126 of reduced internal diameter which surrounds the reduced diameter shaft portion 107b. Thus, the actuator shaft 107 is rotatable in the sleeve 125, but has substantially no axial motion therein.

Specifically, the actuator shaft 107 is prevented from moving upward into the sleeve 125, as viewed in FIG. 5, by the interaction between the lower end of the sleeve portion 126 and the upper face of the bracket support side portion 119. Conversely, the actuator shaft 107 is prevented from moving downward out of the sleeve 125 by the interaction between a shoulder 127 on the actuator shaft 107 at the top of the reduced diameter portion 107b, and a shoulder 128 in the sleeve 125 at the top of the reduced diameter portion 126. Thus, the sleeve portion 126 is effectively trapped between the side portion 119 and the shoulder 127 on the actuator shaft 107.

The sleeve 125, and hence the actuator shaft 107, are supported in an axially adjustable manner within the portion 108. Specifically, the sleeve 125 is provided with an external thread 129 which is in engagement with an internal thread 130 on the interior wall of the portion 108. Consequently, rotation of the sleeve 125 within the portion 108 moves the sleeve 125, the actuator shaft 107, and the support 118 as a unit along the axis 107a. A locknut 131 is screwed onto a further external thread on the sleeve 125 and can be tightened against a shoulder 132 in the portion 108 when it is desired to lock the sleeve 125 in the desired adjusted axial position within the portion 108.

The throttling or plug member of the valve of FIGS. 4 and 5 has a cap portion 114 which, as in the case of the valve of FIGS. 1 through 3, is in the form of a ball segment or a cup shaped shell. This member also has a central, axial, cylindrical projection 133 which fits snugly into a hole or recess 134 in the support 118. The projection 133 terminates at 135 in a threaded pin 115 having a fine thread 117 which engages mating threads in an opening in the support 118 through which the pin 115 passes. The purpose of providing the projection 133 and the mating recess 134 in the support 118 is to minimize the flexural loading of the pin 115.

A counter nut 124 on the pin 115 retains the latter, and hence the cap 114, in a selected position relative to the support 118 when the nut 124 is tightened against the support 118. The cap 114 is provided with an internal hexagon-shaped wrench socket 116 which serves the same adjusting purpose as is provided by the socket 16 in the valve of FIGS. 1 through 3. As shown, the outer diameter of the cap 114 is somewhat greater than the internal diameter of the ring seat 105. This enables the cap 114 to be in sealing engagement with the ring seat 105 for the selected adjusted position of the cap 114.

Figure 6:
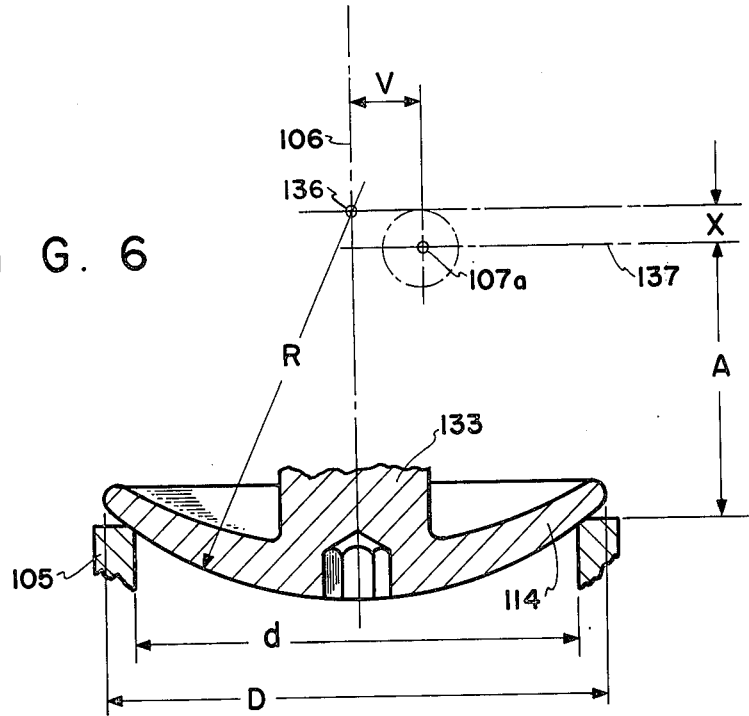
FIG. 6 is a diagram illustrating the relative positions of the actuator shaft axis and the plug face center of curvature for the valve of FIGS. 4 and 5 according to the first of the above-noted further constructional features.

As previously noted, the valve of FIGS. 4 and 5 includes the construction which provides the previously described advantageous positional relationship between the plug cap center of curvature and the actuator shaft axis. Thus, the actuator shaft 107 is so relatively positioned in the valve of FIGS. 4 and 5 that the distance from the face of the cap 114 to its center of curvature on the ring seat axis 106, when the cap 114 is in its closed position on the ring seat 105, is greater than the distance along the axis 106 from the cap face to the perpendicular projection of the actuator shaft axis 107a onto the axis 106. This construction and relationship are illustrated in the diagram of FIG. 6, wherein the center of curvature of the face of the cap 114 — that is, the center for the radius R of the curvature of the cap face—is shown at 136, and wherein the perpendicular projection of the actuator shaft axis 107a onto the axis 106 of the ring seat 105 is shown by the line 137. The cap 114 is shown in FIG. 6 as being in its fully closed position on the ring seat 105, whereby the cap face center of curvature 136 is shown as lying on the axis 106.

FIG. 6 shows said advantageous relationship by showing that the distance along the axis 106 from the cap face to the center of curvature 136 is greater by an amount X than the distance along the axis 106 from the cap face to the intersection of the line 137 with the axis 106. This illustrated relationship may be more simply defined by the statement that the axis 107a is displaced from the center of curvature 136 in the direction of the closed cap 114 by the amount X. Such displacement could, of course, advantageously be provided in the valve of FIGS. 1 through 3 if desired.

As previously noted, FIG. 6 also shows the offset distance V for the axis 107a. Additionally, FIG. 6 shows the previously described construction of the cap 114 whereby its outer diameter D is made greater than the internal diameter d of the ring seat 105.

OPERATION OF THE VALVE OF FIGS. 4 AND 5

After assembling the various parts of the valve as shown in FIGS. 4, 5, and 6, the actuator shaft 107 is rotated to bring the support 118 and the cap 114 into their closed positions illustrated in FIGS. 4 and 6. A hexagonal-shaped wrench, not shown, is then inserted into the socket 116. This wrench is then rotated to rotate the cap 114 and the pin 115 along the thread of the support 118 in the direction to bring the entire circumference of the cap face into the desired tight sealing engagement with the ring seat 105. As this adjustment is being made, the cap 114 is properly guided by the action of the projection 133 moving axially within the support recess 134.

The aforementioned dimensional variations due to manufacturing tolerances which bring about the desirability of providing the displacement X and the adjustable sleeve 125 include variations in the position of the axis 107a, in the offset distance V, and in the distance A (FIG. 6) between the top of the ring seat 105 and the axis 107a. Variations in the distance A occur, for example, as a result of the screwed-in ring seat 105 arriving at different final positions in different valves.

The obtaining of said desired tight sealing engagement by the making of the above-described adjustment of the cap 114 on the support 118 is aided, in the presence of such of the above-described dimensional variations as are existent, by the inclusion in the valve of the displacement X and the adjustable sleeve 125. Specifically, the presence of the displacement X permits the actuator shaft 107 and the cap 114 to be rotated, to swing the cap 114 relative to the ring seat 105, through whatever small angle may be necessary while seeking the adjusted position of the cap 114 on the support 118 which yields said desired tight sealing engagement. The illustrated relationship between the cap diameter D and the internal seat diameter $d$ also aids in permitting said shaft and cap rotation to be employed in arriving at said desired sealing engagement adjustment of the cap 114 on the support 118.

Additionally, the presence of the adjustable sleeve 125 provides whatever positioning of the cap 114 along the actuator shaft axis 107a is needed to obtain said desired tight sealing engagement. Such proper positioning of the cap 114 is obtained by rotating the sleeve 125 in the portion 108 as necessary to place the sleeve 125, the actuator shaft 107, the support 118, and hence the cap 114 in the required axial position along the axis 107a and relative to the ring seat 105. Such rotation of the sleeve 125 may be effected by rotating a suitable tool in engagement with the sleeve 125, such as a hollow wrench slipped over the actuator shaft 107 after the temporary removal of the packing 109 and the nut 131. When the axial position of the cap 114 which gives the desired sealing condition has been achieved by such rotation of the sleeve 125, the latter is desirably locked in the corresponding proper position by tightening the nut 131 on the sleeve 125 against the shoulder 132.

When the proper position of the cap 114 on the support 118 has finally been obtained, and said desired tight sealing engagement has been achieved, the cap 114 is secured in said proper position by tightening the nut 124 against the support 118. Thereafter, rotation of the actuator shaft 107 causes the valve to open and seal with a minimum of cap and ring seat wear, and without bending or deformation of the support 118.

In conclusion, it is believed to be clear from the foregoing description that the disclosed valve constructions fulfill the objects stated herein. Thus, these disclosed valve constructions are ones which can be manufactured economically, and which provide for the convenient adjustment of the valve plug into that position which provides reliable fluid-tight closure of the plug on the ring seat over long periods of operation without requiring bending or deformation of the plug actuating bracket, and with a minimum of rubbing action and wear between the plug and ring seat surfaces.

The embodiments of the invention in which an exclusive property or privilege is claimed are defined as follows:

1. A rotary control valve, comprising
a housing,
a ring seat mounted in said housing,
a plug member,
an actuating bracket disposed in said housing,
means for supporting said bracket in said housing so that it can rotate about an axis that is orthogonal and offset with respect to the axis of said ring seat, and
an adjustable rigid connecting means extending between said plug and said bracket for rigidly connecting said plug in any one of a number of different spaced apart positions with respect to said bracket, said rigid connecting means including a rigid member having ends which are rigidly secured, respectively, to said bracket and to said plug in a manner to permit the adjustment of said plug to that one of said positions at which the rotation of said bracket tilts said plug into and out of fluid tight engagement with said ring seat without bending or deformation of said bracket or said rigid member, and without relative movement between said bracket and said plug.

2. The control valve as defined in claim 1, wherein said plug has the form of a cup shaped shell, and wherein said rigid member has a longitudinal axis which passes through the center of curvature of said shell, and which coincides with the center axis of said ring seat when said plug has said fluid tight engagement with said ring seat.

3. A rotary control valve, comprising
a housing,
a ring seat mounted in said housing,
a plug member in the form of a cup shaped shell having a center of curvature,
an actuating bracket disposed in said housing,
means for supporting said bracket in said housing so that it can rotate about an axis that is orthogonal and offset with respect to the axis of said ring seat, and
an adjustable rigid connecting means extending between said plug and said bracket for rigidly connecting said plug in any one of a number of different spaced apart positions with respect to said bracket, said rigid connecting means including a rigid member having ends which are rigidly secured, respectively, to said bracket and to said plug in a manner to permit the adjustment of said plug to that one of said positions at which the rotation of said bracket tilts said plug into and out of fluid tight engagement with said ring seat without bending or deformation of said bracket or said rigid member, and without relative movement between said bracket and said plug, the distance from said shell along said axis of said ring seat to said center of curvature of said shell being greater than the distance from said shell along said axis of said ring seat to the perpendicular projection of said axis of rotation of said bracket onto said axis of said ring seat when said plug has said fluid tight engagement with said ring seat.

4. The control valve as defined in claim 3, wherein said means for supporting said bracket includes a shaft means for imparting said rotation to said bracket on said axis of rotation, and wherein said valve includes a second adjustable means for permitting the adjustment of said plug relative to said ring seat along said axis of rotation.

5. The control valve as defined in claim 4, wherein said second adjustable means includes a sleeve, wherein said sleeve surrounds said shaft and prevents the axial movement of the latter apart from the axial movement of said sleeve, and wherein said sleeve is axially adjustable in said housing to effect the axial positioning of said shaft relative to said housing.

6. The control valve as defined in claim 5, wherein said sleeve is in screw threaded engagement with said housing.

7. A rotary control valve, comprising
a housing,
a ring seat mounted in said housing,
a plug member,
an actuating bracket disposed in said housing,
shaft means for supporting said bracket in said housing so that said shaft and said bracket can rotate about an axis that is orthogonal and offset with respect to the axis of said ring seat,
an adjustable rigid connecting means extending between said plug and said bracket for rigidly connecting said plug in any one of a number of different spaced apart positions with respect to said bracket, said rigid connecting means including a rigid member having ends which are rigidly secured, respectively, to said bracket and to said plug in a manner to permit the adjustment of said plug to that one of said positions at which said rotation of said bracket tilts said plug into and out of fluid tight engagement with said ring seat without bending or deformation of said bracket or said rigid member, and without relative movement between said bracket and said plug, and
second adjustable means for permitting the adjustment of said plug relative to said ring seat along said axis of said shaft.

8. The control valve as defined in claim 7, wherein said second adjustable means includes a sleeve, wherein said sleeve surrounds said shaft and prevents the axial movement of the latter apart from the axial movement of said sleeve, and wherein said sleeve is axially adjustable in said housing to effect the axial positioning of said shaft relative to said housing.

9. The control valve as defined in claim 8, wherein said sleeve is in screw threaded engagement with said housing.

10. A rotary control valve, comprising
a housing,
a ring seat mounted in said housing,
a plug member,
an actuating bracket disposed in said housing,
means for supporting said bracket in said housing so that it can rotate about an axis that is orthogonal and offset with respect to the axis of said ring seat, and
an adjustable rigid connecting means extending between said plug and said bracket for rigidly connecting said plug in any one of a number of different spaced apart positions with respect to said bracket, said rigid connecting means including a rigid threaded member having ends which are rigidly secured, respectively, to said bracket and to said plug, one of said ends being thus secured by means of the threads on said member to permit the adjustment of said plug to that one of said positions at which the rotation of said bracket tilts said plug into and out of fluid tight engagement with said ring seat without bending or deformation of said bracket or said rigid member, and without relative movement between said bracket and said plug.

11. A rotary control valve, comprising
a housing,
a ring seat mounted in said housing,
a plug member,
an actuating bracket disposed in said housing,
means for supporting said bracket in said housing so that it can rotate about an axis that is orthogonal and offset with respect to the axis of said ring seat, and
an adjustable rigid connecting means extending between said plug and said bracket for rigidly connecting said plug in any one of a number of different spaced apart positions with respect to said bracket, said rigid connecting means including a rigid threaded pin having one end which is rigidly fixed with respect to said plug and having a threaded portion which is adjustably rigidly secured to said bracket by means of the threads of said threaded portion to permit the adjustment of said plug to that one of said positions at which the rotation of said bracket tilts said plug into and out of fluid tight engagement with said ring seat without bending or deformation of said bracket or said rigid pin, and without relative movement between said bracket and said plug.

12. The control valve as defined in claim 11, wherein said bracket is provided with threads which engage said threads of said threaded portion, whereby said adjustment of said plug is effected by rotating the latter.

13. The control valve as defined in claim 12, wherein a contoured tool engagement socket is provided in a surface of said plug which faces said ring seat when said plug has said fluid tight engagement with said ring seat, said socket facilitating said rotating of said plug to effect said adjustment thereof.

* * * * *